Patented Sept. 22, 1931

1,824,101

UNITED STATES PATENT OFFICE

GEORGE FREDERICK SMITH, OF URBANA, ILLINOIS

STRONTIUM PERCHLORATE COMPOSITION AND PROCESS OF PREPARING THE SAME

No Drawing.   Application filed May 10, 1930.   Serial No. 451,519.

This invention relates to strontium perchlorate compositions and to processes of preparing the same.

It has hitherto been supposed that the only useful strontium perchlorate was the practically pure substance, and that it could be prepared commercially only by reacting on a suitable strontium compound with perchloric acid.

According to the present invention a somewhat impure strontium perchlorate may be prepared which is commercially as useful as the pure substance, and from this the substantially pure salt may be prepared if desired.

Other features and advantages will hereinafter appear.

Strontium carbonate was ground in a ball mill in the cold with ammonium perchlorate in the proportions theoretically required, viz. one molecular equivalent of the carbonate to two of the perchlorate. These reacted to the extent of about 13% after grinding for twenty-four hours.

The ground material was transferred to an oven and kept at a temperature close to 250° C. It was found advantageous to briquette the ground material as by compressing it into tablets by a high-pressure power-driven pill machine. When this was done a fifty per cent. yield of strontium perchlorate was obtained at the end of twenty-four hours heating in the oven.

Another lot of the tableted ground material was heated at the same temperature for nine hours and between 86% and 88% of strontium perchlorate was obtained by maintaining in the heating oven a vacuum equal to a pressure of one inch of mercury. Sometimes the heating in vacuum was continued for twelve hours. Other perchlorates, such as magnesium, were also advantageously prepared by heating ground reacting substances in tablet form.

A basic reaction may be caused to take place by using an excess of strontium carbonate, and an acid reaction caused to take place with an excess of ammonium perchlorate,—the latter often being preferable. The product obtained, when the reacting substances were properly tableted and then heated in the oven, retained the physical appearance and structure of the materials when tableted. As a result the final tablets are very porous and, because of their enormous surface, go into solution very easily and rapidly. Moreover such tablets are easily impregnated with inflammable material to produce a colored flame in a flare.

To avoid decomposition of the ammonium perchlorate in the process of manufacturing strontium perchlorate the maximum temperature should not exceed 280° C., and the temperature is often best kept lower, for some impurities cause decomposition to begin at a lower temperature.

Strontium oxide yields more strontium perchlorate in the cold when substituted for the carbonate, but often produces objectionable by-products which make the product less stable and the operation of the process less smooth.

The ordinary strontium carbonate of commerce has been found a satisfactory raw material and yields a perchlorate from which chlorates are absent so far as shown by standard tests. The presence of ammonium perchlorate in compositions for flares is not objectionable, for, unlike potassium perchlorate, it produces no color in a flame tending to suppress the color due to strontium or other metals.

The strontium perchlorate is well adapted to support combustion and is more effective in producing a flame of the desired color than is strontium nitrate, because the perchlorate yields a chloride emission spectrum and this is brighter than the oxide emission spectrum yielded by the nitrate.

A flare may be made by saturating a suitable absorbent, such as paper or paper pulp, with a solution of strontium or other perchlorate in an organic solvent. The same carrying some ammonium perchlorate may be used.

Strontium perchlorate is soluble in many organic solvents, especially such as alcohols, ketones, and aldehydes, and therefore can be readily separated by solution, filtration and evaporation from excess carbonates, and, by the use of a proper organic solvent in which ammonium perchlorate is not soluble, can be readily freed from any excess of ammonium perchlorate used, yielding pure strontium perchlorate.

To purify the strontium perchlorate from chlorates, from ammonium perchlorate, and from strontium carbonate a suitable solvent is N butyl alcohol, but ethyl acetate, iso-butyl alcohol, normal propyl alcohol, ethyl alcohol, and acetone, are also efficient and commercially economical.

Having thus described certain embodiments of the invention, what I claim is:

1. The process of producing a product containing strontium perchlorate which consists in grinding together a strontium compound and ammonium perchlorate.

2. The process of producing a product containing strontium perchlorate which consists in grinding together a strontium compound and ammonium perchlorate and heating the ground mixture.

3. The process of producing a product consisting largely of strontium perchlorate which consists in grinding together a strontium compound and ammonium perchlorate and heating the ground mixture in a vacuum to about 250° C.

4. The process of producing a product containing strontium perchlorate which consists in grinding together strontium carbonate and ammonium perchlorate.

5. The process of producing a product consisting largely of strontium perchlorate which consists in grinding together strontium carbonate and ammonium perchlorate and heating the ground mixture.

6. The process of producing a product consisting largely of strontium perchlorate which consists in grinding together strontium carbonate and ammonium perchlorate, forming the ground mixture into tablets, and heating the tablets in a vacuum to about 250° C.

7. The process of obtaining substantially pure strontium perchlorate which consists in grinding together strontium carbonate and ammonium perchlorate under such conditions that a substantial amount of strontium perchlorate is produced, dissolving the impure strontium perchlorate in an organic solvent, and separating the dissolved strontium perchlorate from the solvent.

8. The process of obtaining substantially pure strontium perchlorate which consists in grinding together strontium carbonate and ammonium perchlorate, heating the ground mixture under such conditions that a substantial amount of strontium perchlorate is produced, dissolving the impure strontium perchlorate in an organic solvent.

9. Strontium perchlorate carrying several per cent of ammonium perchlorate.

10. Strontium perchlorate carrying about twelve per cent of ammonium perchlorate.

GEORGE FREDERICK SMITH.